Patented Aug. 14, 1951

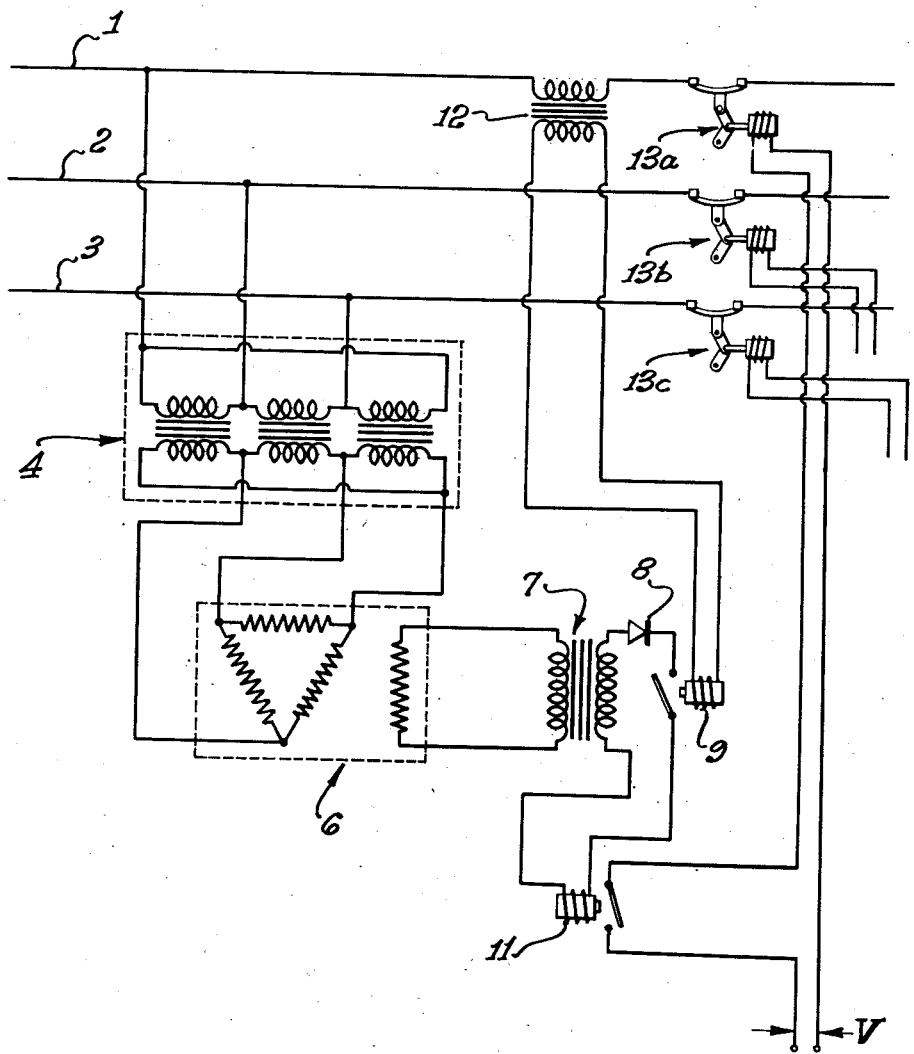

2,564,179

UNITED STATES PATENT OFFICE 2,564,179

ELECTRIC CIRCUIT BREAKER CONTROL SYSTEM

Luis H. Tejada-Flores, Pasadena, Calif.

Application March 5, 1949, Serial No. 79,811

3 Claims. (Cl. 175—294)

The present invention relates to electrical circuit breakers in general and particularly to controls for circuit breakers which effect opening of a circuit at a predetermined point of the current or voltage cycle. More specifically the invention comprises in a preferred form a circuit breaker control system applicable to multiphase circuits in which the current in each phase is interrupted at, or just prior to, its minimum value whereby the power actually interrupted will in each case be a minimum.

In electrical power systems circuits must be opened from time to time for any one of a number of reasons, as for example, the presence of a short circuit in the line. The required capacity of the circuit breaker depends directly upon the amount of electrical energy to be interrupted and that, in turn, depends upon the value of the current and of the voltage. In alternating current systems the current and voltage in each phase is a variable passing alternately through zero and maximum values. In the conventional circuit breaker system the current is interrupted without regard to the value of the current at the time of separation of the contacts. Accordingly, the circuit breaker must have a capacity sufficiently great as to be able to interrupt the current when at its maximum value. Stated differently, theoretically the required circuit breaker capacity to interrupt a given circuit is not a function of the maximum current in the circuit but rather of the current actually to be interrupted. In conventional systems in which the current may be of any value up to its maximum the breaker must be capable of interrupting the maximum current. If the breaker contacts can be made to open slightly prior to the instant of zero current, then the instantaneous current available to form an arc between the separating contacts will vary from relatively small to zero and, accordingly, the capacity of the breaker can be relatively small as compared to that needed in the conventional system. Of course, breaker systems which can open the circuits are also adapted to close them.

With an appreciation of the problems present in the field of electrical circuit breakers and the advantages to be gained by the opening of the current in each phase at a minimum instantaneous value it is an object of the present invention to provide a circuit breaker system which accurately controls the opening of the breaker in each phase and permits of the interruption of the current at a predetermined point in its cycle.

It is another object of the invention to provide an apparatus for interrupting electrical circuits by which electrical current can be interrupted at a predetermined point relative to the passage of the current through its minimum value.

Still another object of the invention is to provide a control system for circuit breakers in a multiphase electrical circuit by which the operation of the circuit breaker in each phase can be initiated a predetermined time interval prior to the passage of the current in that phase through a fixed value in order to compensate for the inherent time lag in mechanical operation.

These and other more specific objects will appear upon reading the following specification and claims and upon considering in connection therewith the attached drawing to which they relate.

In the drawing there is illustrated diagrammatically a preferred electrical circuit embodying the circuit-interrupting control comprising the present invention. A three phase power line is illustrated and is seen to comprise conductors 1, 2 and 3. A battery of potential transformers is indicated generally by the reference character 4, each of the transformers having its primary connected between two of the conductors and its secondary connected to one winding of the three phase stator winding of a Selsyn transmitter, indicated generally by the reference character 6. The transformers of unit 4 function as a source of three phase voltage and may be connected in any conventional manner. Any suitable equivalent form of providing a voltage drop could be substituted, however, as, for example, current transformers connected to suitable impedance elements so that the voltage drop across the latter could be used as a three phase voltage supply. Also, any source of voltage in synchronism and in phase with the circuit to be protected could be used.

The Selsyn transmitter, the three phase stator of which is connected across the secondaries of the transformer battery 4, is included for the purpose of shifting the phase of its output voltage with respect to a line voltage. The three phase voltage applied to the stator of the transmitter is proportioned to the magnitude of the applied voltage. Its rotation depends upon the frequency of the three phase system. In the illustrated form a single phase rotor is under the action of the rotating stator field and the voltage induced in its shifts depending upon the angular adjustment of the rotor. By rotational adjustment of the rotor the phase displacement of its voltage can be varied with respect to any of the three stator voltages over the entire range of 360 degrees. In the preferred embodiment, as previously stated, the operation of the opening of a circuit breaker in a single line of the control circuit is disclosed and described. To control and to open each of the three lines 1, 2 and 3 there could be provided three Selsyn transmitter units 6 or instead a single unit having a three phase rotor, the leads from each of the three phases being connected in circuits similar to that hereinafter described. In the event three individual Selsyn transmitters with single phase rotors were used then each would be connected as described.

The rotor of the Selsyn transmitter is connected directly to the primary of a peaking transformer, indicated generally by the reference character 7. Such a transformer is more or less standard except that the core upon which the secondary winding is wound reaches saturation rapidly and the output voltage comprises a series of positive and negative pulses the duration and magnitude of which depend upon the characteristics of the transformer. In the circuit of the secondary of peaking transformer 7 there is connected in series a dry disc rectifier 8, the contacts of an overcurrent relay 9, and the coil of a tripping relay 11. Rectifier 8 is so arranged in its polarity that only positive voltage pulses may pass through the circuit which, however, is normally opened by the contacts of relay 9.

In the illustrated embodiment it is line 1 which is to be opened and, accordingly, a current transformer 12 has its primary connected in that line, its secondary being across the winding of overcurrent relay 9. Overcurrent relay 9 operates in the presence of a predetermined excessive current in line 1 and any standard type of overcurrent protection relay may be used, it being critical only that it should operate upon the appearance and detection of a predetermined overcurrent in the current transformer 12. It is also important that it should be able to close upon the application of a single pulse of current and thereafter remain closed through suitable mechanism until the main circuit breaker is opened.

The closing of overload relay 9 effects the closing of the circuit including the secondary of peaking transformer 7. As only positive current pulses are permitted by the rectifier 8 to pass through the circuit the energization of the coil of relay 11 will be postponed until a positive pulse from the peaking transformer makes its appearance.

The contacts of tripping relay 11 are in series with the coil of the circuit breaker in line 1, indicated generally by the reference character 13a. The breaker, which may be of conventional design, has its contacts in series with line 1 in which, as previously pointed out, the primary of current transformer 12 is also connected. A regulated tripping voltage is applied to this circuit of the circuit breaker coil and it is important that it be controlled within relatively close limits. In usual practice tripping voltages of 125 volts may vary between 90 to 130 volts resulting in variations in the speed of breaker operation.

The system as applied to the opening of a single line of a three phase system has been described and its operation will now be set forth. Let it be supposed that an overcurrent is caused by some fault or condition making it desirable that lines be opened. The operation in opening the breaker in line 1 is illustrative and is described specifically. As the excessive current appears the overload relay 9 is immediately energized by current from transformer 12 and its contacts close completing the circuit through the coil of tripping relay 11. A single phase current has continuously flowed through the circuit including the secondary of Selsyn transmitter 6 and the primary of peak transformer 7, but the circuit including the secondary of transformer 7 has been opened at the contacts of overload relay 9. Upon the closing of those contacts, however, current first flows upon the peaking transformer passing a positive pulse which is permitted to pass by rectifier 8, all negative pulses being restrained by that unit. The phase relationship of this positive pulse with respect to the originating positive pulse in line 1 has been previously determined by the angular adjustment of the rotor of Selsyn transmitter 6. Preferably that adjustment is such that, allowance being made for the time delay to effect the mechanical opening of breaker 13a, its winding will be actuated sufficiently prior to the passage of the current in line 1 through its zero value as to enable the breaker contacts to separate immediately prior to the current reaching that value. Actually the mechanical delay includes the time delay in the operation of relay 11 as well as in the circuit breaker itself. The total time delay will be constant so that once determined the lead which must be given to the energizing current by the Selsyn rotor can be fixed.

In the drawing additional circuit breakers 13b and 13c are shown connected in lines 2 and 3, respectively. Each of these circuit breakers must be provided with its own control circuit in order that it will open in the predetermined relationship relative to the passage of its current through its zero value. Overload transformers similar to transformer 12 must be provided in lines 2 and 3 and control circuits as described can be repeated for each breaker. Each of the circuits can be actuated from a single group of potential transformers 4. In one preferred embodiment the Selsyn transmitter 6 is provided with a three phase secondary so that the only duplications which need be made are in those portions of the control circuit between the transmitter and the circuit breaker itself, the circuits including different windings of the Selsyn rotor.

It is preferable that the adjustment of the Selsyn transmitter be such that each breaker starts to open its contacts as the current in the line to be opened approaches zero. This means that the current will be diminishing as the contacts separate so that when the current zero value is actually reached an appreciable gap will have been established, thereby reducing the possibility of arcing.

A circuit breaker control system reducing the amount of power interrupted is desirable for the safety which it provides through reducing danger of explosion and fire. Additionally, it is possible for circuit breakers of smaller capacity to be used for the energy interrupted is not the maximum energy carried by the line but instead the minimum. The method is also desirable because of the consistency of its operation which insures reduced arcing and burning of the electrodes and the minimizing of destructive explosive forces in the quenching oil. Obviously the circuit can also be used to close circuit breakers at any point of the current cycle, a factor which is controllable by the adjustment of the Selsyn rotor itself.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A circuit breaker control system for an electrical circuit in which the actuating coil of the line breaker is controlled by a tripping relay having its own actuating coil in the circuit of the contacts of an overload relay energized by overcurrent in the line, said system comprising a transformer connected to the line to be opened and producing a voltage proportional thereto, a non-rotating phase shifter having its primary connected to said transformer and including a secondary producing a voltage shifted in phase with respect to the voltage of said line, and a peaking transformer having its primary connected to the secondary of said phase shifter and its own secondary in the circuit of a rectifier and the actuating coil of said tripping relay to provide a series of actuating pulses with said circuit closed by the contacts of said overload relay.

2. In a control system for a circuit breaker including actuating means and separable contacts in the alternating current line to be interrupted, a transformer connected to provide a voltage of the same frequency and in phase with the voltage of said line, a Selsyn transmitter of the type having a non-rotating primary coil adapted to receive an impressed voltage and a non-rotating secondary coil shiftable with respect to said primary coil to vary the phase of its output voltage with respect to the impressed voltage, the primary coil of said Selsyn transmitter being connected across the secondary of said transformer and its own secondary coil being connected to the primary of a peaking transformer, the circuit of the secondary coil of said peaking transformer including a rectifier, the coil of a tripping relay, and the contacts of an overload relay, the coil of said overload relay being connected to receive current from the line to be interrupted and the contacts of said tripping relay being connected in the control circuit of the actuating means of said circuit breaker.

3. A circuit breaker control system for an electrical circuit in which the actuating coil of the line breaker is controlled by a tripping relay having its own actuating coil in the circuit of the contacts of an overload relay energized by overcurrent in the line, said system comprising a transformer connected to the line to be opened and producing a voltage proportional thereto, a voltage phase shifter of the type having non-rotating primary and secondary coils, the latter being angularly adjustable to produce a voltage shifted in phase with respect to the voltage impressed upon the primary, the primary coil of said phase shifter being connected to the secondary of said transformer, and a circuit to energize the actuating coil of said tripping relay in the presence of an overload current in the line comprising the secondary coil of a peaking transformer, the primary of which is connected to the secondary coil of said phase shifter, connected in series with a rectifier restricting the flow of current to one direction and the contacts of said overload relay.

LUIS H. TEJADA-FLORES.

REFERENCES CITED

The following references are of record in the file of this patent:

UNITED STATES PATENTS

| Number | Name | Date |
| --- | --- | --- |
| 1,848,298 | Aalborg | Mar. 8, 1932 |
| 2,225,763 | Bayha | Dec. 24, 1940 |

OTHER REFERENCES

Abstract 694,388, vol. 627, page 1223, O. G. Oct. 25, 1949.